Oct. 24, 1939.  H. KRETZ  2,177,435
METHOD OF MAKING ROUND COMPOUND METALLIC ARTICLES
Filed Oct. 14, 1936
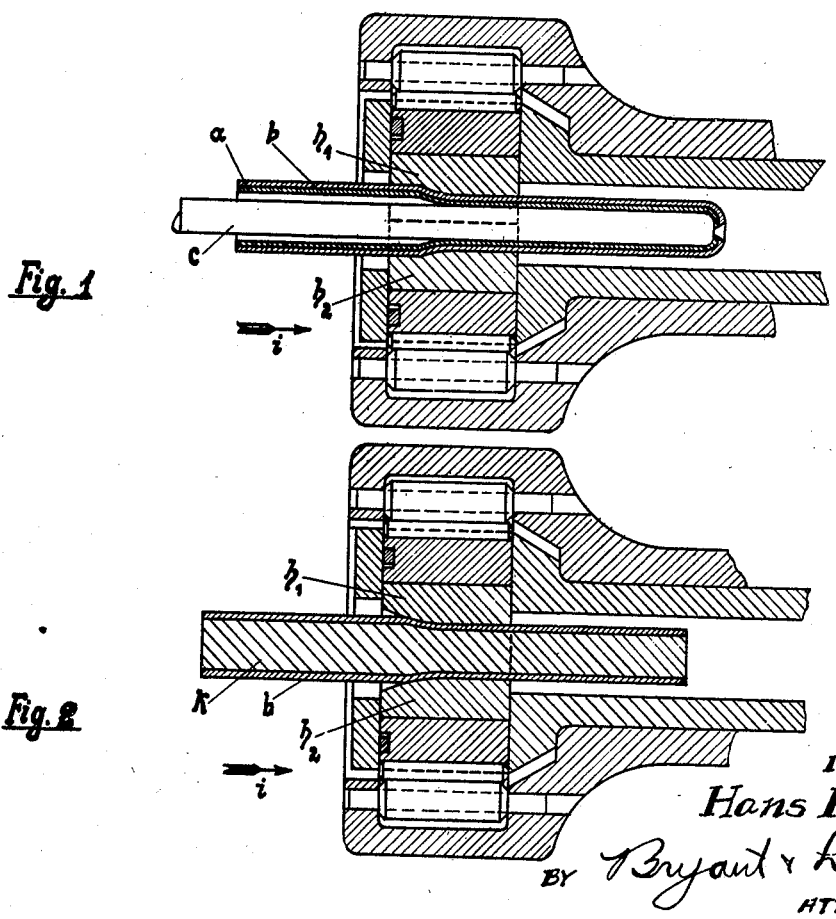
INVENTOR
Hans Kretz
BY Bryant & Lowry
ATTORNEYS Patented Oct. 24, 1939

2,177,435

UNITED STATES PATENT OFFICE 2,177,435

METHOD OF MAKING ROUND COMPOUND METALLIC ARTICLES

Hans Kretz, Pforzheim, Germany, assignor to Fr. Kammerer A.-G., Pforzheim, Germany, a corporation of Germany Application October 14, 1936, Serial No. 105,604 In Germany October 22, 1935

2 Claims. (Cl. 78—92)

My invention relates to a method of making round compound metallic articles which may be tubular or solid.

It is an object of my invention to provide a method by which better compound articles are obtained than could be made heretofore.

To this end, I place a sheath of welding metal on the article—which may be a tube or a solid body, e. g., wire, heat the article and the sheath on the article to welding heat, shift both members axially while striking blows in radial direction, and in rapid succession, against the sheath, and effect relative rotation of the points where the blows are struck against the sheath and the article, preferably by suitable reciprocating dies, or percussion jaws, about the axis of the article. I may rotate either the article with respect to the reciprocating dies, or percussion paws, or, conversely, I may rotate the dies with respect to the article.

It is another object of my invention to provide a method, as specified, for the manufacture of tubular compound articles.

To this end, I place the tubular article on a mandrel with which it is shifted axially, and otherwise proceed as described above.

I am aware that it is old in this art to make compound tubes by welding a sheath on a tubular article, but in this old method the welding pressure is exerted by rolls, and not by reciprocating dies, or percussion jaws, as in my invention. It has been found that with rolls it is impossible to exert uniform welding pressure all over the sheath, and so the weld is not perfect.

I am also aware that dies, or percussion jaws, are old in the art of making plain tubes, and my invention does not reside in the use of dies, nor in the heating of the article and its sheath but it resides in the combination of certain features which may be old individually but have never been combined before.

My new combination is very useful since the method can be performed in a simple apparatus and notwithstanding this produces a perfect weld, not only on account of the uniform action of the dies, or percussion jaws, as against the unequal action of rolls, but also because the dies break up any oxide which may be present between the sheath and the article. The metal is not subjected to tensile stress while hot, and so I am not limited to the use of high tensile metals but may use metals of any mechanical properties including those whose tensile strength is reduced by heating to welding temperature.

In the accompanying drawing, I have illustrated, by way of example, a machine for making tubular compound articles, and a machine for making compound wire.

Fig. 1 shows the formation of a compound tube with the aid of reciprocating dies, or percussion jaws.

Fig. 2 shows the formation of a compound wire.

Referring now to the drawing, and first to Fig. 1, this machine for making tubular compound articles is equipped with a set comprising two or more radially acting rapid beating reciprocating dies, or percussion jaws $h_1$ and $h_2$, between which a tubular article $a$ and a sheath $b$, placed together on a mandrel $c$, are pressed or drawn at welding temperature in the direction of the arrow $i$. The size and movement of the percussion jaws are such that in closed position they leave a passage similar to a drawing channel in a drawing-die, so that the cross-sectional area of the tube is sufficiently reduced. To ensure that the tube is worked on all points of its periphery, the percussion jaws circulate sufficiently quickly about the tube during their beating movement.

It is likewise possible for the tube to carry out a sufficiently rapid rotary movement about its axis besides its feeding movement, in which case the percussion jaws do not circulate.

Referring now to Fig. 2, when producing compound wires a solid wire $k$ (Fig. 4), takes the place of the inner tube $a$ so that it is not necessary to employ a member corresponding to the mandrel $c$. In other respects the method remains unchanged.

I claim:

1. The method of welding round compound metallic articles of great length, comprising placing a sheath of welding metal on the article, heating the article and the sheath thereon to welding heat, shifting both members axially and while still heated striking blows in radial direction, and in rapid succession, against the sheath, and effecting relative rotation of the points where the blows strike the sheath, and the article, about the axis of the article.

2. The method of welding tubular compound metallic articles of great length, comprising placing a tubular article on a mandrel, placing a sheath of welding metal on the article on the mandrel, heating the article and the sheath thereon to welding heat, shifting the three members axially and while still heated striking blows in radial direction, and in rapid succession, against the sheath, and effecting relative rotation of the points where the blows strike the sheath, and the article, about the axis of the article.

HANS KRETZ.